United States Patent Office 3,560,301
Patented Feb. 2, 1971

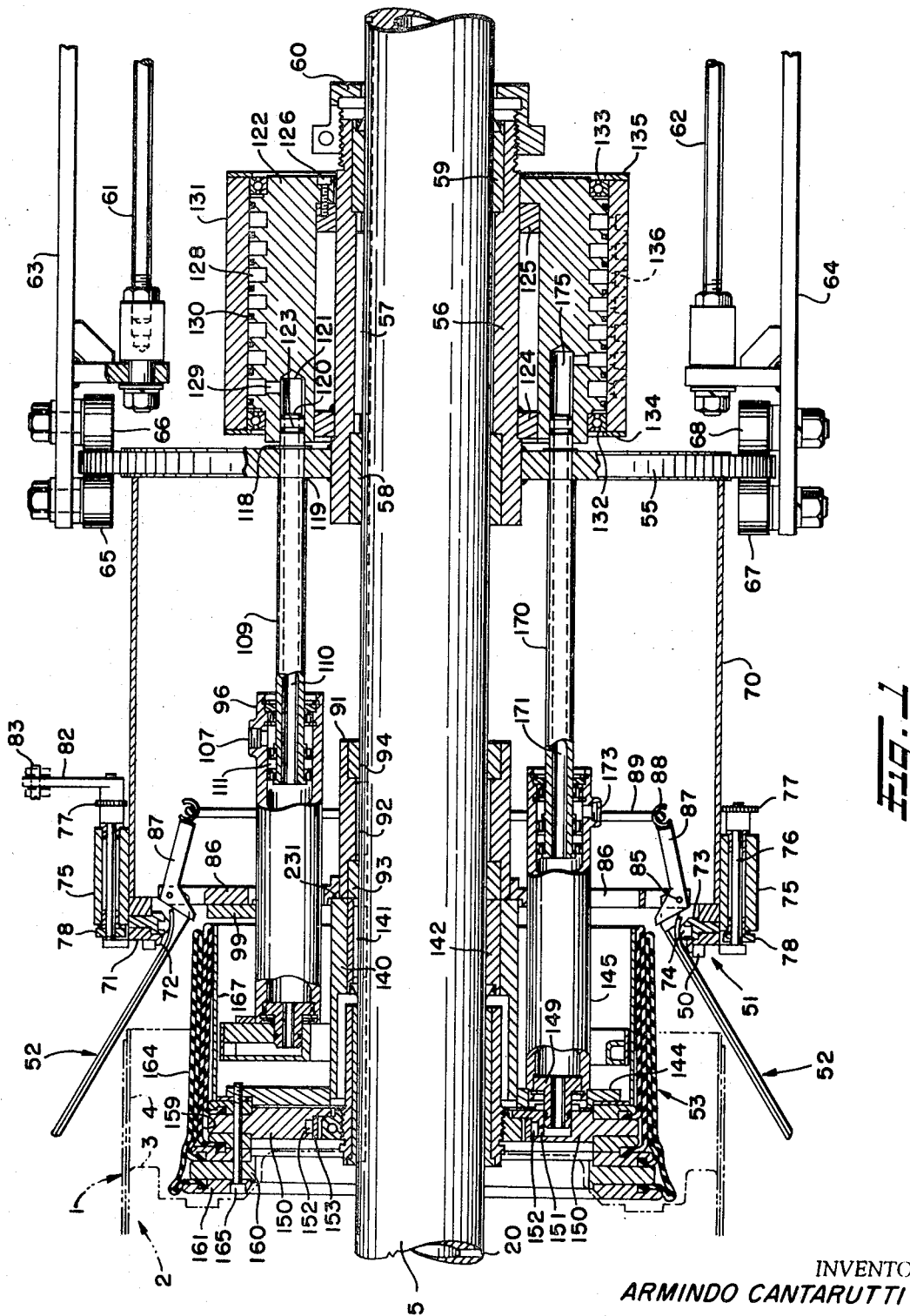

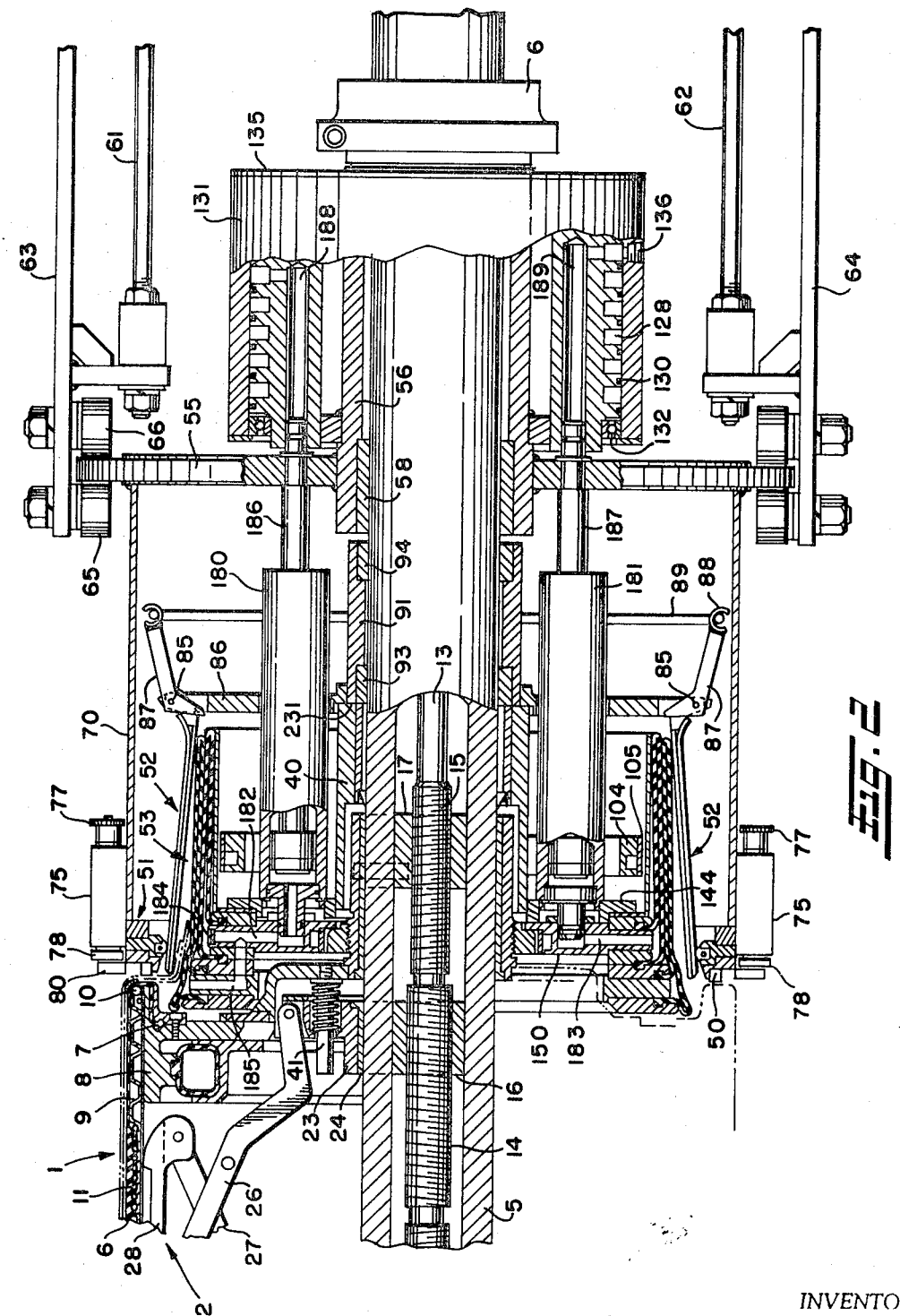

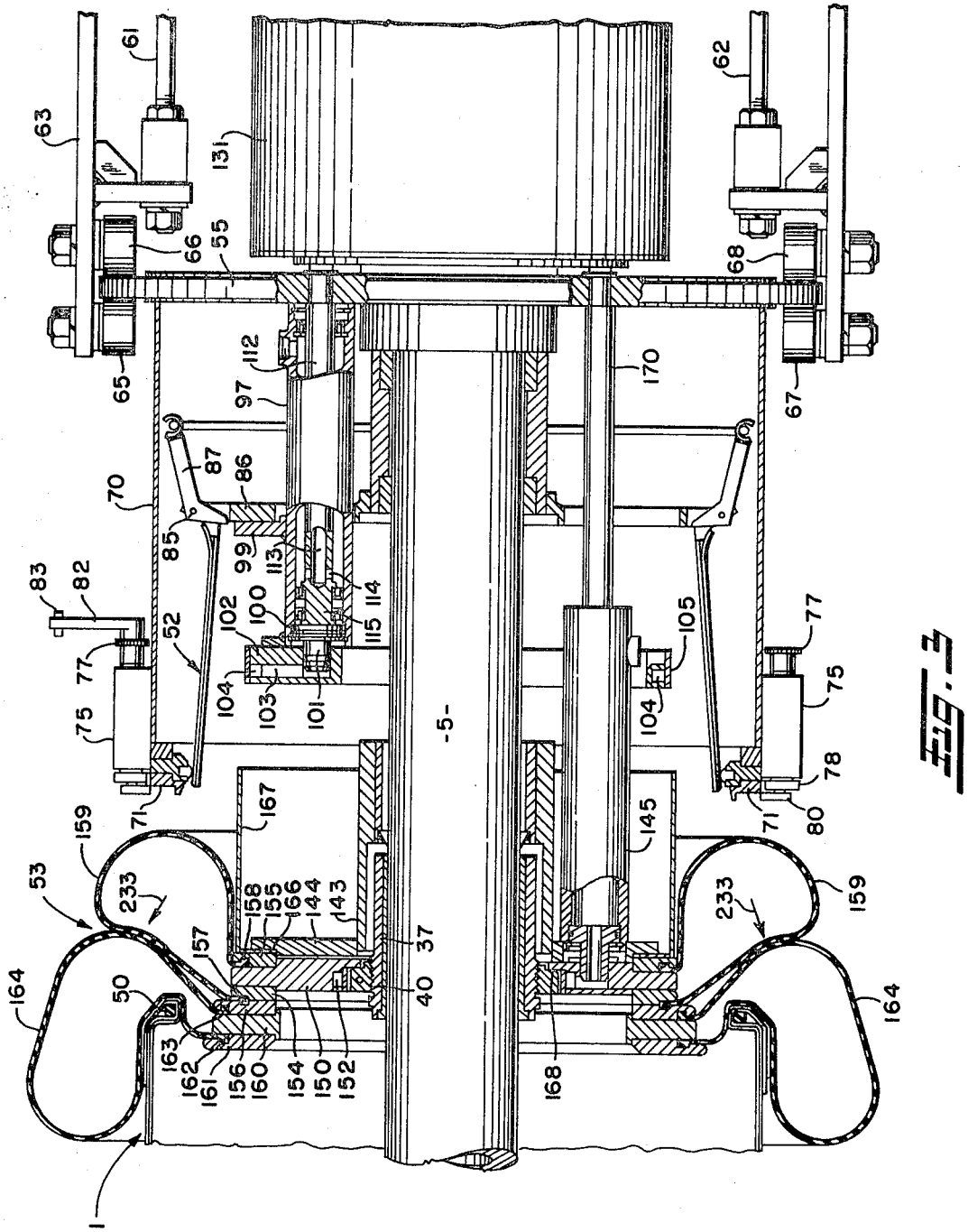

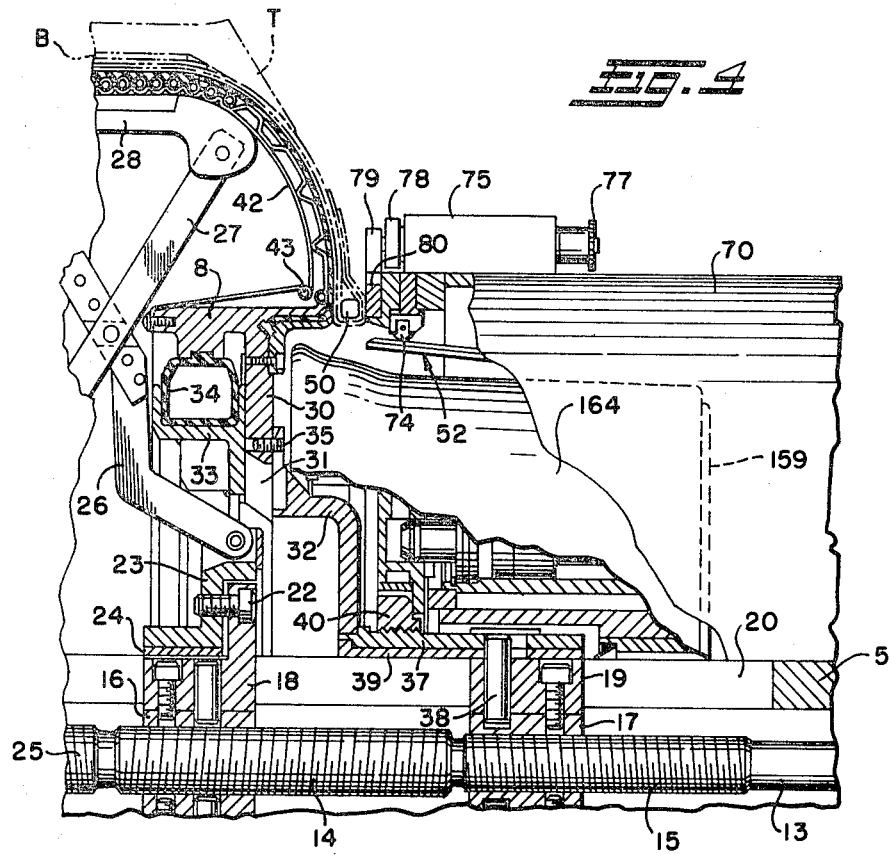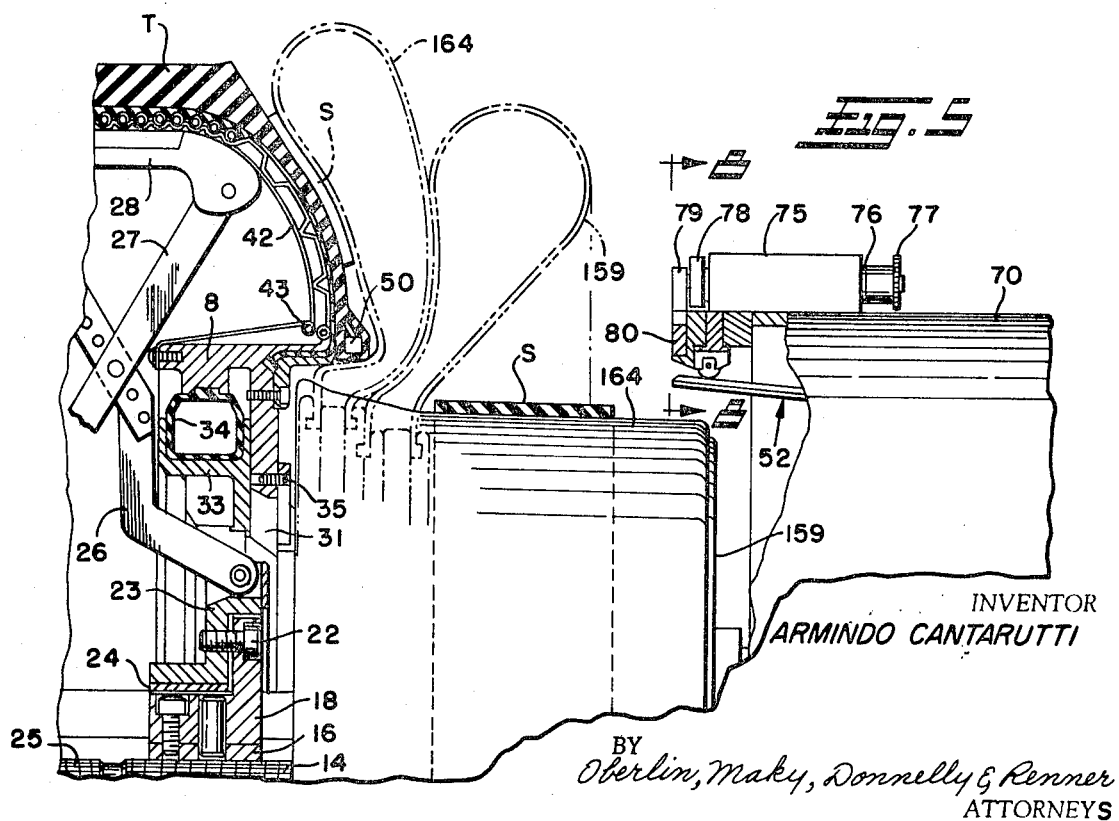

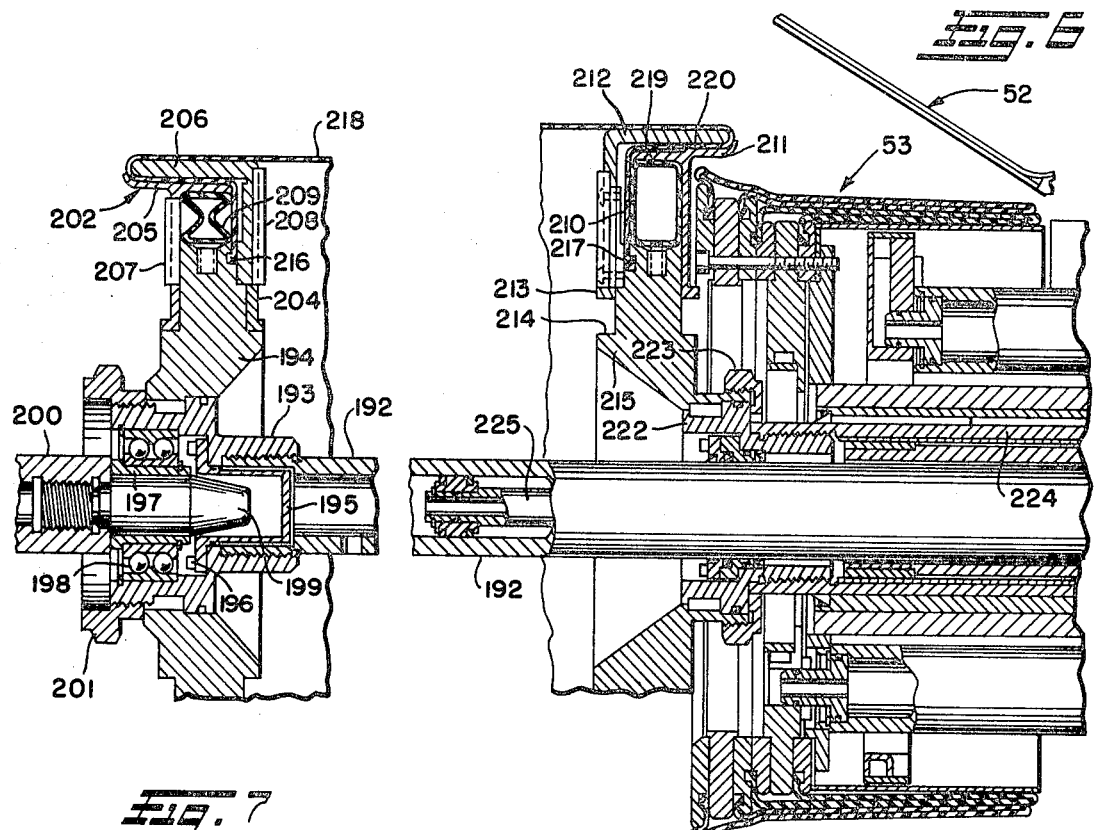
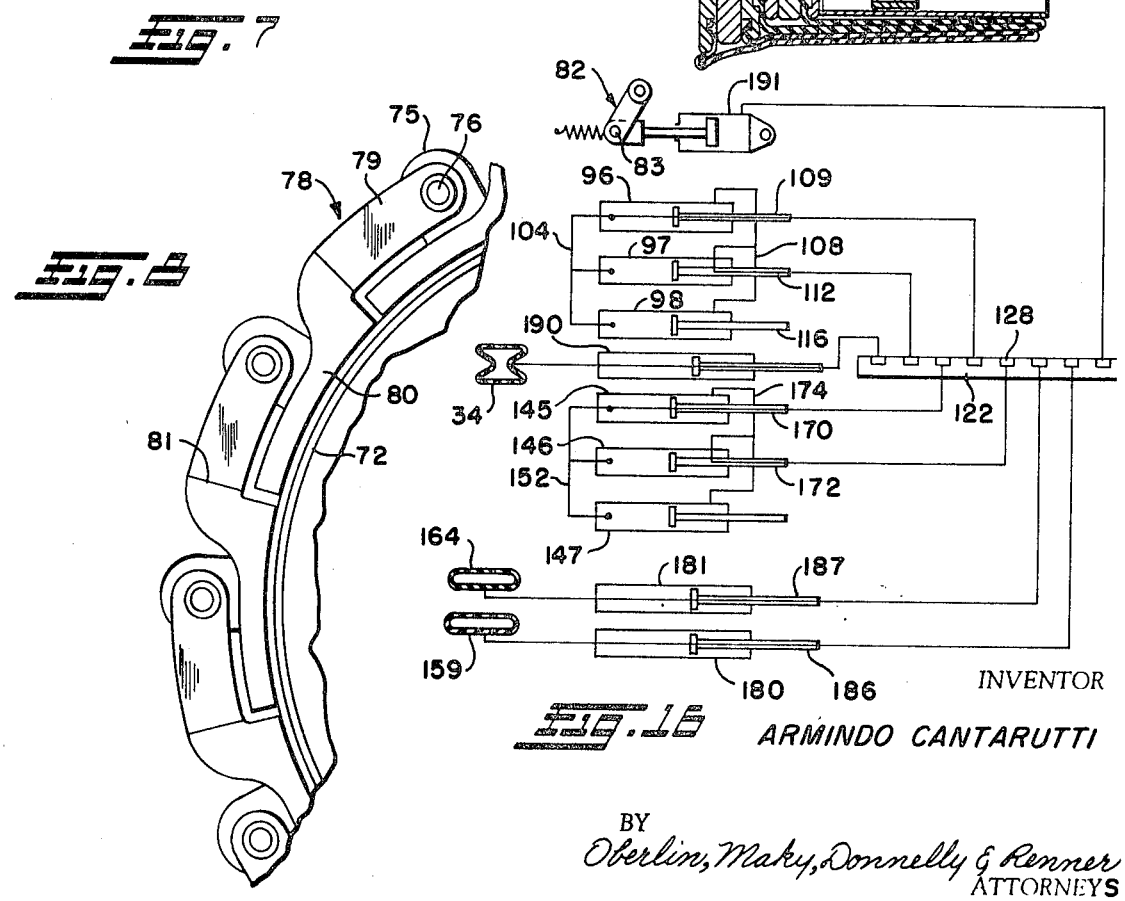

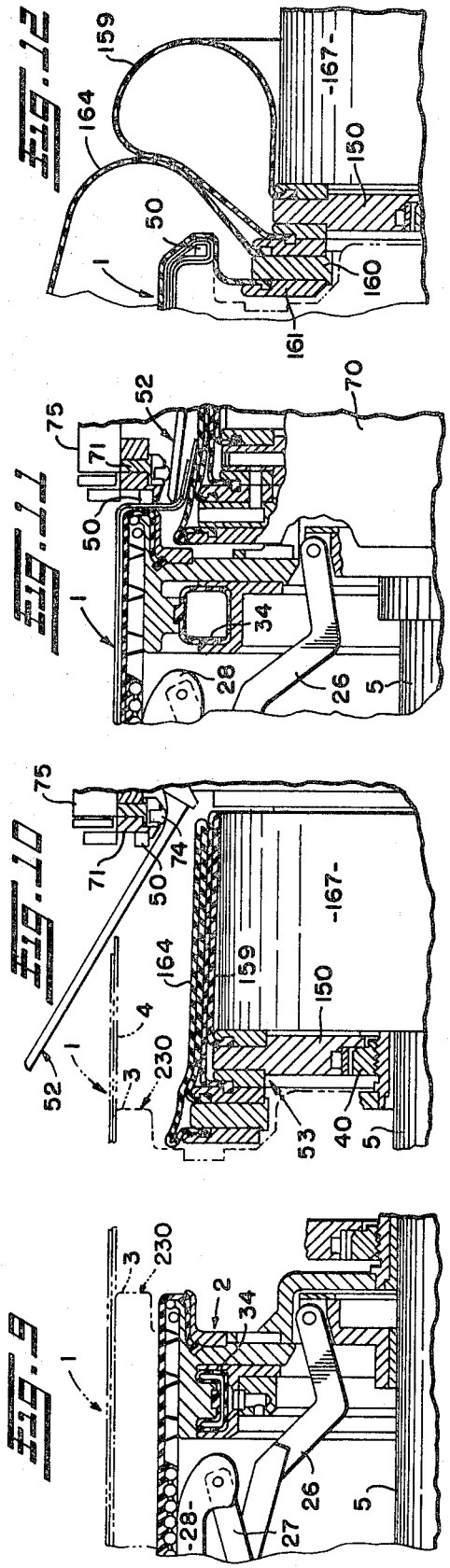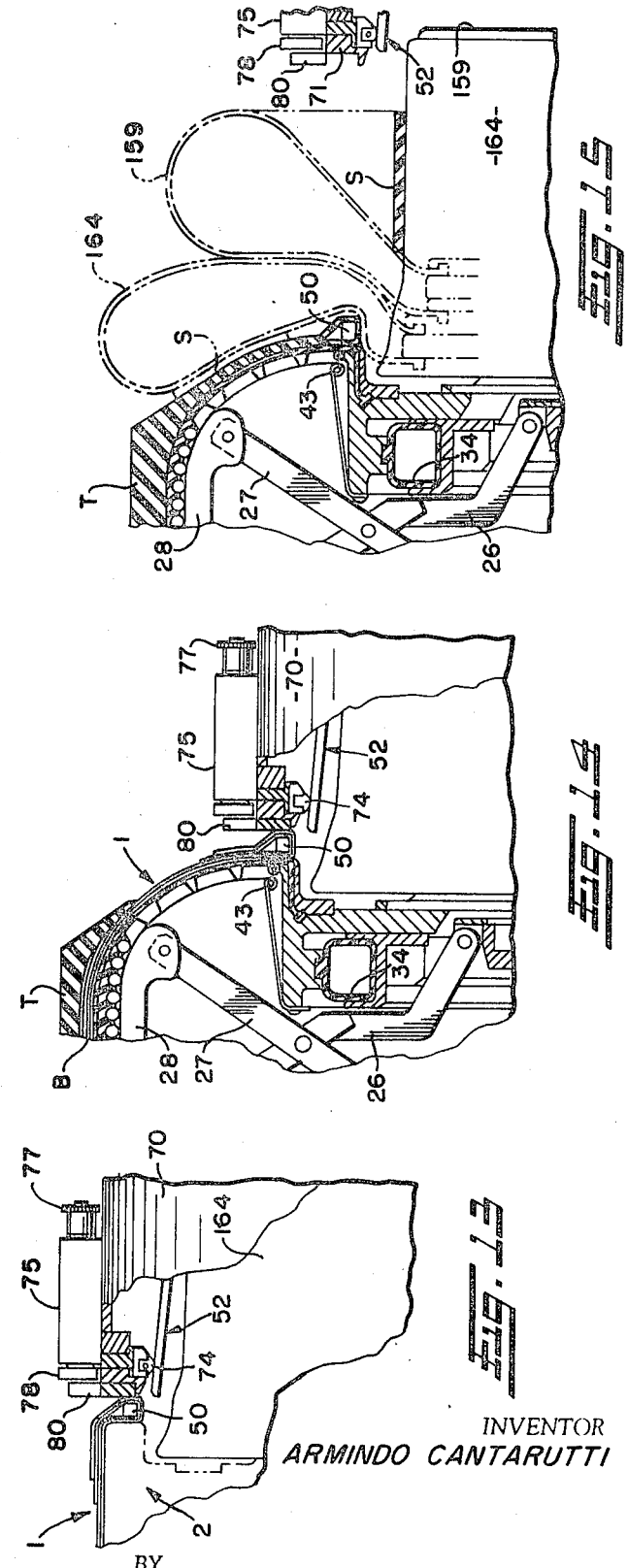

3,560,301
TIRE BUILDING MACHINE
Armindo Cantarutti, Akron, Ohio, assignor, by mesne assignments, to NRM Corporation, a corporation of Ohio
Filed May 29, 1967, Ser. No. 642,067
Int. Cl. B29h 17/12, 17/22, 17/26
U.S. Cl. 156—401                            27 Claims

ABSTRACT OF THE DISCLOSURE

An automatic tire building machine especially suitable for the production of radial tires having a bead setting and dual bag ply turn-up mechanism cooperating with an expansible rotatable drum to place the bead and properly turn the plies thereabout and then to place the side wall material.

---

This invention relates generally as indicated to a tire building machine and more particularly to certain improvements in a tire building machine of the type disclosed in applicant's copending application Ser. No. 390,-161, filed Aug. 17, 1964, entitled "Tire Building Machine," now Pat. No. 3,438,832. Such application discloses a unique tire building machine utilizing a ply-down and bead setting mechanism which incorporates two expansible cooperating air bags brought into position at each end of the machine drum which, when inflated, will uniformly turn the ply material in one single quick operation about the bead ring and firmly press or stitch the same against the drum without rotation of the latter producing automatically a ply turn-up of uniform quality free of wrinkling and distortion.

In the production of radial tires on an expansible drum, the ends of the drum wherein the bead rings are positioned move toward each other as the drum expands to tire shape. It is a problem to set the bead, turn the plies uniformly, and then expand the drum moving the beads toward each other without producing some wrinkles or distortion in the ply fabric. To avoid possible distortion, the beads should be firmly clamped in position as they are moved toward each other during the expansion of the drum. Thereafter, the belt, tread stock, and side wall will be applied to the drum.

Heretofore, many complex hand operations have been required in such manufacture of the more complex radial tire, but with the present invention, the ply can be turned down, the bead set, the ply then turned up and firmly pressed against the ply material. The beads can then be firmly clamped as the drum expands. After the positioning of the carcass in its proper toroidal shape for the application of the belt and tread stock, the tire side wall material may be directly applied to the dual bag turn-up mechanism to be automatically positioned on the carcass and firmly pressed in position upon the expansion of the bags. This then avoids the manual operations involved and ensures greater precision in tire construction: With the present invention, it is possible to utilize cut-to-length materials and program the construction of a tire so that it may be built substantially automatically.

It is accordingly a principal object of the present invention to provide a machine for the production of tires which can readily be automated.

Another principal object is the provision of a machine for the production of radial tires which avoids the many manual operations normally required.

A further object is the provision of a machine which will product a tire in a more automatic manner and which will ensure that the tire is free of defects caused by wrinkling or distortion of the tire materials.

Another important object is the provision of a radial tire building machine which can maintain the beads clamped properly in position as the drum of the machine is expanded and rotated.

Still another object is the provision of a tire building machine wherein the same ply turning mechanism can be employed to place the tire side wall material.

Yet another object is the provision of a machine wherein the tire side wall material can be fed onto the rotatable expansible bag turn-up mechanism to be transferred to the side wall of the carcass.

A yet further object is the provision of a bead setting and ply turn-up mechanism which can be rotated with the drum as well as axially moved with or removed from the ends of the drum.

Other objects and advantages of the present invention will become apparent as the following description proceeds.

In said annexed drawings:
FIG. 1 is a fragmentary horizontal section of one end of the machine illustrating the parts in position preparatory to turning the ply down and setting the bead;
FIG. 2 is a view similar to FIG. 1 illustrating the ply turned down and the bead being set;
FIG. 3 is a view similar to FIGS. 1 and 2 illustrating ply material being turned about the bead;
FIG. 4 is a fragmentary section illustrating the drum expanded with the bead clamped in place;
FIG. 5 is a view similar to FIG. 4 illustrating the application of the side wall material;
FIG. 6 is a fragmentary vertical section of a machine in accordance with the present invention utilizing a different type of expansible drum;
FIG. 7 is a vertical section of the opposite end of the drum seen in FIG. 6 showing the drum collapsed for removal of the tire carcass;
FIG. 8 is an enlarged fragmentary end elevation of the bead clamping mechanism as taken substantially from the line 8—8 of FIG. 5;
FIGS. 9 through 15 are fragmentary sections illustrating successively the steps of the operation of the machine substantially through a complete operating cycle; and
FIG. 16 is a schematic pneumatic diagram partially showing the pneumatic connections for the operation of one end of the machine.

Referring now to the annexed drawings and more particularly to FIGS. 1 through 3, there is illustrated a drum type tire building machine for the production of radial tires which may consist of a carcass of rubberized cord fabric, the cords of which are laid radially or approximately radially of the tire, that is to say parallel to or approximately parallel to the axis of the tire. The plies of the tire shown at 1 may consist of at least one or more layers of the rubberized cord material which cords may be of plastic, textile or wire material. The cords or strands may be laid at a very long angle, which may closely approach a plane transverse to the axis of rotation of the tire. The ply cords are arranged at opposite angles and such angles may range from about 5 to about 20° to a plane transverse to the axis of rotation of the tire in the tire of FIG. 1. The plies are placed upon the drum 2 by rotation thereof and overhang the ends of the drum 3 as indicated at 4. The drum 2 is rotatably mounted on shaft 5 and the plies 1 may be fed onto the drum from a servicer or cut-to-length device in a substantially automatic manner. The shaft 5 is driven from a drive housing which may be to the right as seen in FIGS. 1 through 3.

Because of the use of a breaker band or belt which is substantially inextensible directly beneath the tread stock in a radial tire, the drum 2 is of the expanding type and may include a rubber covering 6, the beaded edge 7 of which is secured beneath the annular flange of the drum end member 8. Beneath the rubber covering 6, there is provided a plurality of flexible transverse metallic bands 9 pivoted at their ends at 10 and the center of the band structure is provided with a plurality of annular garter spring 11 which will expand and provide a continuous undersurface for the cover 6 as the drum expands.

Expansion of the drum is obtained by rotatable center shaft 13 situated within the drum drive shaft 5 which may include two distinct threaded portions 14 and 15 at each end of the drum with the corresponding threaded portions being of opposite hand. Such threaded portions are in engagement with nuts 16 and 17, respectively, seen in FIG. 2 and perhaps more clearly in FIG. 4. Such nuts are connected to projections 18 and 19 riding in slot 20 in the shaft 5 (see FIG. 4).

The projection 18 is secured by fasteners 22 to the annular member 23 which is provided with bushing 24 surrounding the shaft 5. The member 23, and its counterpart moved by the threaded portion 25 of the shaft 13, pivotally support links 26 and 27, respectively, the opposite ends of which are pivoted to member 28, there being one for each of the bands 9. The links 26 and 27, as the members 23 move toward each other, move the members 28 radially outwardly of the drum so that the drum will assume the shape seen for example in FIGS. 4 and 5.

Simultaneously, the end member 8, which is in actuality a plurality of segments, moves axially inwardly and this movement is obtained by the nut 17. The segments forming the end member 8 include an inward projection 30 riding in slot 31 of annular hub 32 which at its axially inner end includes a radially outwardly opening channel 33 supporting annular air bag 34 which underlies the end member segments 8 and which is connected thereto by the tongue and groove connection illustrated. In this manner, the end segments 8 can be moved radially outwardly by inflation of the air bag 34, such outward movement being guided by the slot 31 and limited by stop screw 35. The hub 32 is connected to the inner end of the sleeve 37 which is connected by pin 38 to the nut 17 through the projection 19. The sleeve 37 is provided with a bushing 39 surrounding the shaft 5 and also an adjustable stop ring 40. As seen in FIG. 2, a plurality of spring loaded stops 41 may be positioned between the hub 32 and the annular member 23.

Comparing, for example, the position of the parts of the drum in FIGS. 2 and 4, it will be seen that the drum is converted from a flat almost cylindrical shape to a toroidal shape by the actuation of the shaft 13 when the same is rotated relative to the shaft 5. In the conversion to such toroidal shape, the bands 9 pivot about the outer pivots 10 which move toward each other and as seen in FIG. 4; the bands may include inner members 42 pivoted at 43 and connected to the inside of the end segments 8. In any event, the drum in either position presents a firm yet flexible surface to which the tire materials can be applied. In the expanded or toroidal position of FIG. 4, the belt B and tread stock T will be positioned over the plies 1 and stitched thereto by suitable tools, not shown. However, prior to this expansion of the drum to the toroidal shape shown in FIG. 4, the beads 50 of the tire must be applied and the ply stock turned thereabout in a manner free of wrinkling and distortion. For this purpose, the machine includes a bead setting device shown generally at 51, a ply turn-down device shown generally at 52 and a dual bag turn-up mechanism shown generally at 53 (see the bottom of FIG. 1). It is noted that the drum 2 shown, for example, in some detail in FIGS. 2, 4 and 5 per se forms no part of the present invention.

Referring again to FIG. 1, the components 51 through 53 are supported on annular plate 55 which is secured to hub 56 surrounding the shaft 5. The hub is keyed to shaft 5 for rotation therewith as indicated at 57 and is provided with bushings 58 and 59 at each end to facilitate sliding movement along the shaft. An adjustable stop 60 is mounted on the outer end of the hub 56 limiting axial outward movement of the annular plate 55 and hub 56. Such axial sliding movement is obtained by the rods 61 and 62 of piston-cylinder assemblies arranged at the side of the machine which rods are connected to sliding members 63 and 64, each of which is provided with inwardly directed paired rollers 65 and 66 and 67 and 68 which straddle the periphery of the plate 55. Retraction of the rods 61 and 62 will retract the components 51 through 53 from the end of the drum 2 and conversely the extension will position such components to be positioned properly adjacent the end of the drum in operative position.

The bead setting assembly 51 is mounted on the end of a cylinder 70 and includes a ring 71 having a slightly axially projecting inner shelf 72 on which the bead 50 is positioned. Adjacent the ring 71 is a further ring 73 which includes radially inwardly extending projection 74 cooperating with the ply-down fingers 52. On the exterior of the cylinder 70 adjacent the bead setting ring 71 are a plurality of hubs 75 through which are journalled shafts 76. Such shafts are provided at their outer ends with sprockets 77 and at their inner ends with clamp members 78. The details of the clamp members are seen more clearly in FIG. 8 and each comprises an arm 79 secured to the respective shaft 76 projecting from the hub 75 and a forwardly and downwardly offset portion 80 which when the shafts are rotated in a counterclockwise direction as viewed in FIG. 8 will seat against the projecting shelf 72. When rotated in a clockwise direction as seen in FIG. 8, the offset portions will move away from the shelf 72 clearing the adjacent clamping element by means of the offset 81 and thus providing clearance for the position of the bead on the shelf 72. As seen at the top in FIG. 1, one of the shafts 76 is provided with an arm 82 to which the rod of a piston-cylinder assembly is connected as at 83. Each of the sprockets 77 is connected by a chain so that rocking or rotational movement of the arm 82 occasioned by the connected piston-cylinder assembly will rotate the shafts 76 uniformly the required amount to pivot the offset portions of the clamps toward and away from the bead supporting self 72.

The ply-down fingers 52 are pivoted at 85 to ring 86 and each includes a rearward projection 87 having hook 88 on the end thereof in which is positioned an annular extensible spring 89 urging the fingers 52 to their extended position seen in FIG. 1 which is limited by contact between the projection 74 and such fingers.

The ring 86 is secured to the inner end of a hub 91 which is keyed as indicated at 92 to the shaft 5 for rotation therewith and which is provided with bushings 93 and 94 at both inner ends thereof. Movement of the ply-down fingers 52 with respect to the bead setting assembly 51 is obtained by three piston-cylinder assemblies 96, 97 and 98, the piping for which is shown schematically in FIG. 16. Each of the cylinders may be secured to the ring 86 by means of suitable fasteners extending through projections 99 on the cylinders. The blind end of each cylinder is closed by a plug 100 having a passage therethrough which plug includes a projection 101 extending into a port in member 102 provided with a radial passage 103 connecting with annular passage 104 on the inside of ring 105. Each of the cylinders 96 through 98 is secured to the respective member 102 which is in turn secured to the ring 105. The ring 105 and the passage therewithin serves not only as a support for the blind end of each assembly but also as a means to provide an air connection between each of the three cylinders 96 through 98 at the blind ends thereof.

At the rod end of each of the three cylinders there is provided a tapped port 107 and an air line 108 seen schematically in FIG. 16 connects each of such ports. The rod 109 for the cylinder 96 is provided with a through bore 110 which extends through the piston 111 seen in FIG. 1. The rod 112 for the cylinder 97 is provided with a bore 113 which terminates in a transverse passage 114 directly ahead of the piston 115 as seen in FIG. 3. The rod 116 for the cylinder 98 is solid as seen in FIG. 16.

Each of the rods 109, 112 and 116 projects through the annular plate 55 and is held in place by retaining ring 118 on the outside and shoulder 119 on the inside. The rods 109 and 112 include projections shown at 120 in FIG. 1 which fit within axial passages 121 in annular aluminum block 122. An O-ring seal is provided for each of the projections 120 as indicated at 123. The block 122 is mounted on annular spacer rings 124 and 125 which are secured to the hub 56 and suitable fasteners 126 are employed to secure the block in place. The outer surface of the block may be provided with eight annular grooves seen at 128 and each one is connected by radial passage 129 to the end of an axial passage such as 121 seen in FIG. 1. The axial passages are, of course, circumferentially spaced around the block. O-ring seals 130 are provided on each side of each of the annular grooves providing sealing engagement between the rotatable block 120 and fixed cylindrical shell 131. Ball bearings indicated at 132 and 133 provide a journal between the fixed shell and the block 122. Retaining rings 134 and 135 are secured to the end of the shell to maintain the shell in proper axial position on the block. Tapped ports 136 are provided in the shell 131 for each of the grooves 128 and pneumatic lines may be connected thereto.

The three piston-cylinder assemblies 96 through 98 thus function as a single piston-cylinder assembly to move the ply-down fingers 52 with respect to the bead setting ring 71 which is fixed with respect to the plate 55 by means of the cylinder 70. The retracted position of the fingers is seen in FIG. 3 as compared to the extended position in FIG. 1.

The dual bag turn-up assembly 53 is seen perhaps more clearly in FIG. 3 and such assembly is mounted on hub 140 which is keyed to shaft 5 for rotation therewith as indicated at 141 and which is provided with bushing 142 facilitating sliding movement along such shaft. The hub includes a forward projection 143 supporting radially extending mounting plate 144 in which the blind ends of cylinders 145, 146 and 147 are secured. One of these cylinders is illustrated in detail in FIG. 1, and, of course, all three are shown schematically in FIG. 16. These cylinders may be substantially identical in form to the cylinders 96 through 98 supporting the ply-down fingers for movement. Each cylinder includes a ported end closure 149 which projects into an axial passage in ring 150 which is connected by radial passage 151 to annular passage 152 in the form of an interior groove in the ring 150 which is closed by inner wall 153. The annular passage 152 connects the blind end of each of the cylinders 145, 146 and 147.

The outer edge of the ring 150 is shouldered and on such shoulders supports rings 154 and 155, the former cooperating with the ring 156, to retain the beads 157 and 158 of inner annular air bag 159. The ring 156 also seats on a shoulder of a centering ring 160 as does ring 161 and such rings 156 and 161 cooperate with such centering ring 160 to secure the beads 162 and 163 of outer annular air bag 164. The rings of the assembly may be held together by suitable elongated fasteners 165 seen in FIG. 1 and inwardly directed flange 166 of bag support shell 167 is positioned between the mounting ring 144 and the ring 155 and held in place by such fastener. In the deflated condition of the bags 164 and 159, seen in FIG. 1, they will lie flat against each other and be supported by the shell 167.

The ring 150 is provided with a shoulder 168 which abuts against the adjustable stop ring 40 on the actuating sleeve 37 for the end of the drum 2 and in this manner, when the dual bag turn-up assembly 53 is extended, it will be properly positioned with respect to the end or edge 3 of such drum and, of course, with respect to the bead 50 placed thereagainst.

Movement of the dual bag turn-up assembly 53 is obtained by the three piston-cylinder assemblies 145, 146 and 147 and as seen in FIG. 16, the rod 170 for the cylinder 145 is provided with a through bore 171. The rod 172 of the piston-cylinder assembly 146 is provided with a bore which terminates short of the piston in a transverse port in the same manner as the bore 113 for the cylinder 97 seen in FIG. 3. The third cylinder 147 is provided with a solid rod and each of the tapped ports at 173 at the rod end of the cylinders 145 through 147 is interconnected by air line 174.

As seen in FIG. 1, the rod 170 is secured to the plate 55 and includes a projection extending into passage 175 of the rotary block 122 which is connected to the second annular passage 128. The three cylinders 145 through 147, like the cylinders 96 through 98, function then as a single double-acting piston-cylinder assembly.

Referring now to FIG. 2 as well as FIG. 16, it will be seen that two additional cylinders 180 and 181 are supported in the mounting ring 144 with the blind ends thereof being connected to radial passages 182 and 183, respectively, in the ring 150. The passage 183 opens to the inner air bag 159 while the passage 182 is closed at its outer end as seen at 184 and includes a branch passage 185 leading to the ring 160 and opening radially outwardly to the outer air bag 164. The rods 186 and 187 for the cylinders 180 and 181 include through bores which are connected to the axial passages 188 and 189 in the rotary block 122. Such passages are connected respectively to adjacent grooves 128 in such rotary block. The piston-cylinder assemblies 180 and 181 then simply comprise extensible connections between the rotary block and the two air bags of the bag turn-up assembly 53, the rods 186 and 187 being secured to the annular plate 55 while the cylinders are secured to the mounting ring 144.

Grooves and axial passages are also provided in rotary block 122 to supply air to bags 34 through extensible connection 190 and to the piston and cylinder assembly 191 connected to arm 82 as at 83 seen more clearly in FIG. 16.

It will be appreciated that only one end of the machine is illustrated and that the opposite end of the machine against the opposite side of the drum will also be provided with a dual bag turn-up assembly 53, a bead setting assembly 51 and a cooperating ply turn-down 52, also mounted for rotation with the shaft 5.

As illustrated in FIGS. 3 and 5, for example, when the shell or cylinder 70 is retracted to provide an annular space between the bead 50 and the bead setting ring 71, the air bags 159 and 164 are then free to expand. This expansion may occur at two portions of the cycle of the operation and that is when the ply 1 is turned up and around the bead 50 and then later in the cycle after the drum has been expanded to its toroidal shape, when the side wall material S is applied to the side of the torus. The rotation of the two dual bag turn-up mechanism permits the bags when deflated as shown in full lines in FIG. 5 to act as a building drum for the application of the material S thereto. When the bags are inflated, the side wall stock S is then transferred to the side of the torus and uniformly stitched thereto by the pressure of the bags. Alternatively, additional stitching tools may be employed after the side wall stock has been transferred to the wall of the torus.

Referring now to FIGS. 6 and 7, there is illustrated a modification of the present invention employing a radial tire drum of a more simplified nature than that illustrated in FIG. 4, for example. The drum includes a main shaft 192 cantilevered from the inboard side of the machine and driven for rotation during the tire building cycle. The outer end of the drum is threaded and hub 193 is secured thereon which in turn supports the drum wall member 194. The interior of the hub 193 is provided with a cup-shape closure member 195 which is secured to the hub by suitable fasteners 196. A rotary sleeve 197 is supported inside the hub by means of ball bearing 198 and the pilot end 199 of outboard shaft 200 fits therewithin. A large nut 201 is provided on the hub to secure the end wall member 194 in place.

The outer periphery of the end wall 194 forming the undercut peripheral end of the drum comprises a plurality of clamping segments 202 formed by cooperating clamping members 203 and 204 each of which include axially extending portions 205 and 206 with the latter overlying the former. As indicated, the radial portions of the clamping elements are positioned on opposite sides of the end wall 194 in guides 207 and 208. Radial movement of the clamping elements is obtained by an inflatable annular air bag 209, shown deflated in FIG. 7, positioned between the axially extending portion 205 of the element 203 and the outer periphery of the end wall 194.

In FIG. 6, the drum is shown expanded to the position to receive the beads with the annular air bag 210 being inflated forcing the clamping elements 211 and 212 radially outwardly to the extent permitted by the engagement of the flanges 213 with the guides. In the retracted position, the annular air bag is vented and the flanges will then abut against the shoulders 214 in the end wall 215. As illustrated, the clamping elements cooperate together to clamp the annular beads 216 and 217 of the molded rubber drum 218.

As seen perhaps more clearly in FIG. 6, the horizontally inwardly extending portion 219 of the clamping element 211 includes an undercut portion beginning at 220 so that the drum 218 is clamped only from that point outwardly. From the point 220 to the bead 217, the drum wall is unclamped and thus free to stretch as the drum moves from its FIG. 7 to its FIG. 6 condition. The drum may be molded in substantially the condition seen in FIG. 7.

The wall 215 is mounted on hub 222 with the aid of large nut 223 and the hub is in turn threadedly secured to sleeve 224. Axial movement of the sleeve 224 to the left as seen in FIG. 6 and axial movement of the shaft 192 to the right as seen in FIGS. 6 and 7 causes the end walls 194 and 215 to move toward each other and air may be supplied to the drum through tube 225 to cause the same to expand to toroidal shape for the construction of radial tires. The entire assembly, of course, rotates for the application of tire building materials thereto and each end of the drum will be provided with the ply-down, bead setting, and dual bag turn-up mechanism which may be substantially identical in form to that illustrated in FIGS. 1, 2 and 3.

OPERATION

The operational cycle of the machine is perhaps best understood by referring to the sequence views of FIGS. 9 through 15 with the drum 2 in its initially collapsed condition obtained by deflation of the air bags 34. A bead ring 50 will be placed upon the inboard side of bead setting ring 71. The drum 2 is now expanded to the phantom line position shown at 230 and upon rotation, the plies 1 are applied. The plies overhang the end of the drum substantially as shown at 4 and the piston rods 61 and 62 are now extended to bring the plate 55 into the position shown more clearly in FIG. 1 with the assemblies 96 through 98 and 145 through 147 already extended. In such extended condition of the later, the ply-down finger assembly 52 will be in its elevated position. The air bags 159 and 164 will be deflated to lie flat against the cylindrical support 167. As the plate 55 moves into position, the stop ring 40 will be engaged by the ring 150 of the assembly 53. Any slight overtravel on the part of the assembly 53 will simply compress the air within the piston-cylinder assemblies 145 through 147.

With the components in the FIG. 10 position, and the plies having been applied to the drum 2, the rods 61 and 62 are now extended moving the bead setting ring 71 axially toward the end 3 of the drum 2. Since the ring 86 supporting the piston-cylinder assemblies 96 through 98 as well as the hub 91 are in engagement with the hub 140, as indicated at 231 in FIG. 1, the pivot 85 for the ply down fingers 52 will be held against further axial movement toward the drum. As the bead 50 moves inwardly toward the end of the drum, the camming projection 74 causes the fingers 52 to pivot radially inwardly and this automatically turns the plies 1 over the end 3 of the drum and causes them to lay in the position indicated at 232 substantially horizontally on the top deflated bag 164. As seen in FIG. 11, the plies have now been turned down and the bead 50 has been set. In the setting of the bead, the pressure obtained by the piston rods 61 and 62 may be utilized to overcome the pressure within the cylinders 95 through 98 or such pressure may be vented.

After the beads are set and the plies turned down as indicated in FIG. 11, the piston rods 61 and 62 will be retracted and the piston-cylinder assemblies 96 through 98 will also be retracted to assume the position shown more clearly in FIG. 3. At this time, air is now supplied to the bags 164 and 159 through the extensible rods 180, 186 and 181, 187. Due to the natural tendency of the bags to center with respect to their beads, the inner bag pushes the outer bag laterally toward the drum as indicated by the arrows 233 in FIG. 3. When the air bags are inflated as seen in FIG. 12, the ply edge is turned up in a single operation which does not require the rotation of the drum. The pressure of the bag will turn the ply about the bead and up over the top of the drum stitching the same thereto in a manner free of wrinkles and distortions. However, since the ply turn-up mechanism will rotate with the drum, it is possible to accomplish the turn-up operation while both the drum and turn-up are rotating.

At the completion of the turn-up operation, the bags are deflated to lie flat against the cylindrical support. With the piston-cylinder assemblies 96 through 98 retracted, the bead setting assembly 51 is now extended by extension of the rods 61 and 62, but with the clamp elements 78 rotated into place so that the circular forwardly offset portions 80 seat against the shelf 72 of the bead ring 71. A substantially annular clamping surface is presented which will hold the bead with the plies turned thereabout against the end 3 of the drum 2. In the position shown in FIG. 13, the drum is now ready to be converted to the torus shape seen in FIG. 14. This conversion is accomplished by the rotation of the center shaft 13 seen in FIG. 2 and as such drum is converted to the torus shape, the ends 3 of the drum will move toward each other and accordingly also the beads 50 placed thereagainst. As the stop ring 40 moves to the left as seen in FIG. 4 with the expansion of the drum 2, the cylinder 70 will follow therealong maintaining the clamping pressure against the beads until the drum achieves the position of FIG. 14. At this point, the drum will be rotating for the application of the belt or band B and the tread stock and during such rotation, the clamping pressure against the bead is still maintained.

After the application of the belt B and the tread stock T, the bead setting ring with the clamping elements in position is withdrawn to expose the cylindrically disposed outer bag 164 on which the tire side wall stock S may then be applied by rotation of the machine. The bags are then inflated as seen in FIG. 15 to apply the side wall material to the toroidal carcass and after deflation of the bags, the material may be further stitched to the carcass if desired. The bags are then deflated and the drum is then collapsed back to the full line position shown in FIG. 9 so that the now formed carcass may be withdrawn axially of the drum toward the outboard side.

Many minor variations may occur in the cycle of the machine depending upon the particular procedures desired to be employed by the tire manufacturer. For example, in FIG. 11, the bead 50 can be set in place and the bead setting ring withdrawn far enough to position the clamping elements 78 against the shelf 72 and then the drum may be expanded with pressure applied against the bead prior to the turn-up of the plies. In the FIG. 14 position, the clamping element may then be withdrawn and the bags inflated to accomplish the ply turn-up when the tire is already in its toroidal shape. In this condition, the centrifugal force of the revolving machine may assist the bags in applying substantially increased pressure to turn-up and stitch the plies back against the side wall of the carcass. Other variations such as turning certain plies under and certain plies over may also be employed, but in any event, there is illustrated a machine capable of substantially automatically producing a tire carcass of the radial band type.

I, therefore, particularly point out and distinctly claim as my invention:

1. A tire building machine comprising a radial tire drum adapted to be converted from generally cylindrical to toric shape, a ply-down, bead setting and ply turn-up mechanism, an annular member coaxially rotatably mounted with said drum supporting said mechanism, the bead setting portion of said mechanism thus being coaxially rotatable with said drum, means to move said member axially toward and away from the end of said drum, and means to move the ply-down and ply turn-up portions of said mechanism independently with respect to said member, said ply turn-up portion comprising an inflatable ply engaging bag secured to a ring thus adapted to be positioned inside and near the end of said drum.

2. A machine as set forth in claim 1 wherein the ply turn-up portion of said mechanism includes means operative to push said bag radially outwardly and to cause the same to wrap around the end of said drum.

3. A machine as set forth in claim 2 wherein said last mentioned means comprises a second bag positioned radially beneath said inflatable bag.

4. A machine as set forth in claim 3 including a cylindrical support for said bags so that when said bags are in deflated condition, they will extend substantially flat axially beyon said drum.

5. A machine as set forth in claim 4 including extensible air lines from said member to each of said bags for selectively inflating the same.

6. A tire building machine comprising a radial tire drum, a ply-down, bead setting and ply turn-up mechanism, an annular member coaxially rotatably mounted with said drum supporting said mechanism, means to move said member axially toward and away from the end of said drum, means to move the ply-down and ply turn-up portions of said mechanism with respect to said member, said bead setting portion of said mechanism being fixed with respect to said member and comprising a bead setting ring having an inner axially projecting shelf, and clamp elements adapted to be positioned adjacent said shelf after the setting of the bead against the end of said drum.

7. A machine as set forth in claim 6 wherein said clamp elements are pivotally mounted and interfit with each other to form a substantially circular clamping ring when seated on the shelf of the bead setting ring.

8. A machine as set forth in claim 7 wherein said clamp elements are mounted for limited pivotal movement to and from a position adjacent said shelf, and means operative to pivot said elements simultaneously.

9. A machine as set forth in claim 8 including an inwardly directed projection adjacent said bead setting ring operative to cooperate with the ply-down portion of said mechanism as the latter moves therepast.

10. A machine as set forth in claim 9 wherein said ply-down portion of said mechanism comprises a plurality of pivotally mounted ply-down fingers, and spring means urging said fingers into an extended position.

11. A tire building machine comprising a radial tire drum, a ply-down, bead setting and ply turn-up mechanism, an annular member coaxially rotatably mounted with said drum supporting said mechanism, means to move said member axially toward and away from the end of said drum, and means to move the ply-down and ply turn-up portions of said mechanism with respect to said member, said ply-down and ply turn-up portions of said mechanism being connected to said member each by three piston-cylinder assemblies, two of each three having hollow rods extending through said member.

12. A machine as set forth in claim 11 including a rotary block on the opposite side of said member surrounded by a fixed shell, annular grooves in said block and corresponding ports in said shell, and axial passages in said block interconnecting said grooves and said hollow rods.

13. In combination, a radial tire building drum having axially movable ends, a ply turn-up mechanism comprising an inflatable bag positioned inside and near an end of the drum, means for moving said turn-up mechanism with the adjacent end of said drum, means for rotating said turn-up mechanism including a common drive shaft for said drum and said turn-up mechanism to rotate both at the same r.p.m., said ply turn-up mechanism comprising two inflatable bags overlying each other in a substantially cylindrical condition when deflated, and a ply-down and bead setting mechanism axially movable over said bags when deflated for turning plies over the end of said drum and setting a bead thereagainst.

14. The combination set forth in claim 13 wherein said ply-down and bead setting mechanisms are coaxially mounted with said drum and said turn-up mechanism for rotation at the same r.p.m.

15. The combination set forth in claim 14 wherein said bead setting mechanism includes retractible clamp elements operative to clamp the bead to the end of the drum.

16. The combination set forth in claim 14 including means for moving said bead setting mechanism with the adjacent end of said drum.

17. A tire building machine including a drum which expands radially to tire shape as the ends of the drum move axially toward each other, means operative to set a bead against an end of such drum, and clamp means operative to apply an axial clamping force against the bead to positively clamp such bead and ply fabric engaged thereby axially against such end so as to maintain a fixed relation between the bead and the ply fabric engaged thereby during shaping of the tire as such ends move toward each other.

18. A tire building machine as set forth in claim 17 including means operative coaxially to rotate said clamp means and such drum.

19. A tire building machine including a drum which expands radially as the ends of the drum move toward each other, means operative to set a bead against an end of such drum, clamp means operative to clamp such bead thereagainst as such ends move toward each other, and means operative coaxially to rotate said clamp means and such drum, said clamp means being mounted on a bead setting ring for movement to and from an operative clamping position.

20. A tire building machine as set forth in claim 19 wherein said clamp means includes a plurality of circular segments mounted on axially offset arms.

21. A tire building machine as set forth in claim 20 wherein each of said arms is mounted on a shaft extending axially, but radially offset from said bead setting ring, and means operative to rotate said shafts in unison to move said segments to and from operative clamping position.

22. A tire building machine as set forth in claim 21 including means operative to turn a ply over the end of the drum and to set a bead thereagainst, and then turn the ply up over the bead prior to the clamping of the bead against the end of the drum.

23. A tire building drum for radial tires and the like comprising a molded resilient expansible drum element having axially inturned edges terminating in radially inwardly extending bead flanges having beads on the inner ends thereof, axially movable drum end walls to which said beads are secured, and radially movable clamping members mounted on said end walls clamping only a portion of the axially inturned edges of said element.

24. A drum as set forth in claim 23 wherein said clamping members include overlapping axially extending portions.

25. A drum as set forth in claim 24 wherein said clamping members are guided for radial movement on opposite sides of the respective end wall.

26. A drum as set forth in claim 24 wherein said clamping members engage said drum element only at the outer ends of said axially extending portions with said drum element being free to extend and retract from there to said beads.

27. A drum as set forth in claim 23 including annular air bag means operative radially to move said clamping members.

References Cited

UNITED STATES PATENTS

| | | | |
|---|---|---|---|
| 3,111,445 | 11/1963 | Pouilloux et al. | 156—415X |
| 3,188,260 | 6/1965 | Nebout | 156—401X |
| 3,265,549 | 8/1966 | Woodhall et al. | 156—401X |
| 3,360,418 | 12/1967 | Novikov et al. | 156—403X |
| 3,374,138 | 3/1968 | Porter et al. | 156—403X |
| 3,414,446 | 12/1968 | Pearce et al. | 156—132 |

FOREIGN PATENTS

| | | | |
|---|---|---|---|
| 947,182 | 1/1964 | Great Britain | 156—401 |
| 1,043,423 | 9/1966 | Great Britain | 156—416 |

BENJAMIN A. BORCHELT, Primary Examiner

S. C. BENTLEY, Assistant Examiner

U.S. Cl. X.R.

156—403, 415, 416